US008712390B2

(12) United States Patent
Shah et al.

(10) Patent No.: US 8,712,390 B2
(45) Date of Patent: Apr. 29, 2014

(54) ENHANCED TELEPHONY SERVICES

(75) Inventors: Devarshi P. Shah, San Diego, CA (US); Patrik N. Lundqvist, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 12/756,697

(22) Filed: Apr. 8, 2010

(65) Prior Publication Data

US 2011/0250874 A1 Oct. 13, 2011

(51) Int. Cl.
*H04M 3/42* (2006.01)
*H04W 4/02* (2009.01)
*H04M 3/436* (2006.01)
*H04L 29/06* (2006.01)
*H04L 29/08* (2006.01)
*G06F 17/30* (2006.01)

(52) U.S. Cl.
CPC ...... *H04M 3/42017* (2013.01); *H04M 3/42161* (2013.01); *H04W 4/025* (2013.01); *H04M 3/436* (2013.01); *H04L 65/1069* (2013.01); *H04L 67/10* (2013.01); *G06F 17/30864* (2013.01); *G06F 17/30967* (2013.01)
USPC ............. 455/415; 455/414.1; 455/412.2; 455/432.3; 709/203; 379/88.21; 715/773

(58) Field of Classification Search
USPC ............. 455/415, 414.1, 466, 412.2, 432.3; 709/203; 715/773
See application file for complete search history.

(56) References Cited

U.S. PATENT DOCUMENTS

| 4,969,182 A * | 11/1990 | Ohtsubo et al. ............. 379/67.1 |
|---|---|---|
| 2001/0005412 A1 * | 6/2001 | Light et al. ................. 379/88.13 |
| 2004/0141479 A1 * | 7/2004 | Cha et al. ...................... 370/329 |
| 2007/0206736 A1 * | 9/2007 | Sprigg et al. ............... 379/88.21 |
| 2008/0045182 A1 * | 2/2008 | Randall et al. ............. 455/412.1 |
| 2008/0107250 A1 * | 5/2008 | Peuziat et al. ............. 379/142.01 |
| 2008/0305785 A1 * | 12/2008 | Ito .................................. 455/418 |
| 2010/0150333 A1 * | 6/2010 | Goodman et al. ........ 379/207.02 |

FOREIGN PATENT DOCUMENTS

| JP | 2003018324 A | 1/2003 |
|---|---|---|
| JP | 2004140716 A | 5/2004 |
| JP | 2005079845 A | 3/2005 |
| JP | 2008022497 A | 1/2008 |

(Continued)

OTHER PUBLICATIONS

International Search Report and Written Opinion—PCT/US2011/031834, ISA/EPO—Jul. 22, 2011.

(Continued)

*Primary Examiner* — Nimesh Patel
(74) *Attorney, Agent, or Firm* — Jeffrey D. Jacobs

(57) ABSTRACT

Techniques for providing a smart dial controller for enhancing a telephone voice call using a data connection. In an exemplary embodiment, a dial controller may be provided in a calling device for calling another user, and/or a called device for receiving a call from another user. Techniques are provided for both the calling device and the called device to access a content server storing profiles of the calling user and/or the called user, subject to user-determined privacy settings. Such profiles may include, e.g., multi-media information on the status, location, or preferences of the users. In an exemplary embodiment, the dial controller may delay the establishment of a voice connection pending user review and approval of the other user's profile. According to an advantage of the present disclosure, no modifications are required on the network side to implement the techniques described herein.

10 Claims, 8 Drawing Sheets

(56) References Cited

FOREIGN PATENT DOCUMENTS

| | | |
|---|---|---|
| JP | 2009177538 A | 8/2009 |
| WO | WO2007098508 A1 | 8/2007 |
| WO | WO2010026431 A1 | 3/2010 |

OTHER PUBLICATIONS

Mittal, U.S. Appl. No. 12/607,231, entitled, "Method and apparatus for obtaining contextually relevant content" filed Oct. 28, 2009.

* cited by examiner

ENHANCED TELEPHONY SERVICES

TECHNICAL FIELD

The disclosure relates to enhanced telephony services, and more particularly, to the enhancement of telephone voice calls using data services.

BACKGROUND

Recent advances in communications, e.g., cellular telephony and other forms of wireless and wireline communications, have significantly increased the amount of information that can be transferred to and from communications devices. Despite these advances, however, the feature set associated with typical telephone voice calls remains limited.

For example, when a user receives a telephone call, there is usually very limited information that the user receives about the caller, other than perhaps the caller's phone number. If the caller's number is not already stored in the called user's address book, then there is virtually no other information available about the caller's identity. Similarly, when a user places a voice call from a phone, there is virtually no information provided to the caller about the called user's status, e.g., whether the called user is available to talk, the physical whereabouts of the called user, etc.

It would be desirable to provide efficient and backward-compatible techniques for increasing the information available to users during a conventional telephone call.

SUMMARY

An aspect of the present disclosure provides an apparatus comprising: a voice services module; a data services module; and a dial controller configured to receive a request to establish a voice call with the voice services module from a calling device, the dial controller further configured to retrieve context information over a data connection using the data services module according to an identifier of the calling device.

Another aspect of the present disclosure provides an apparatus comprising: a voice services module; a data services module; and a dial controller configured to: retrieve context information about a called device using the data services module according to an identifier of the called device; present the context information using a user interface; and initiate a voice call with the called device using the voice services module.

Yet another aspect of the present disclosure provides a method comprising, at a called device: receiving a request to establish a voice call from a calling device; and retrieving context information over a data connection according to an identifier of the calling device.

Yet another aspect of the present disclosure provides a method comprising, at a calling device: retrieving context information about a called device according to an identifier of the called device; presenting the context information to a user of the calling device; initiating a voice call with the called device; exchanging data with the called device using a data connection prior to the voice call being established; and establishing the voice call with the called device.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
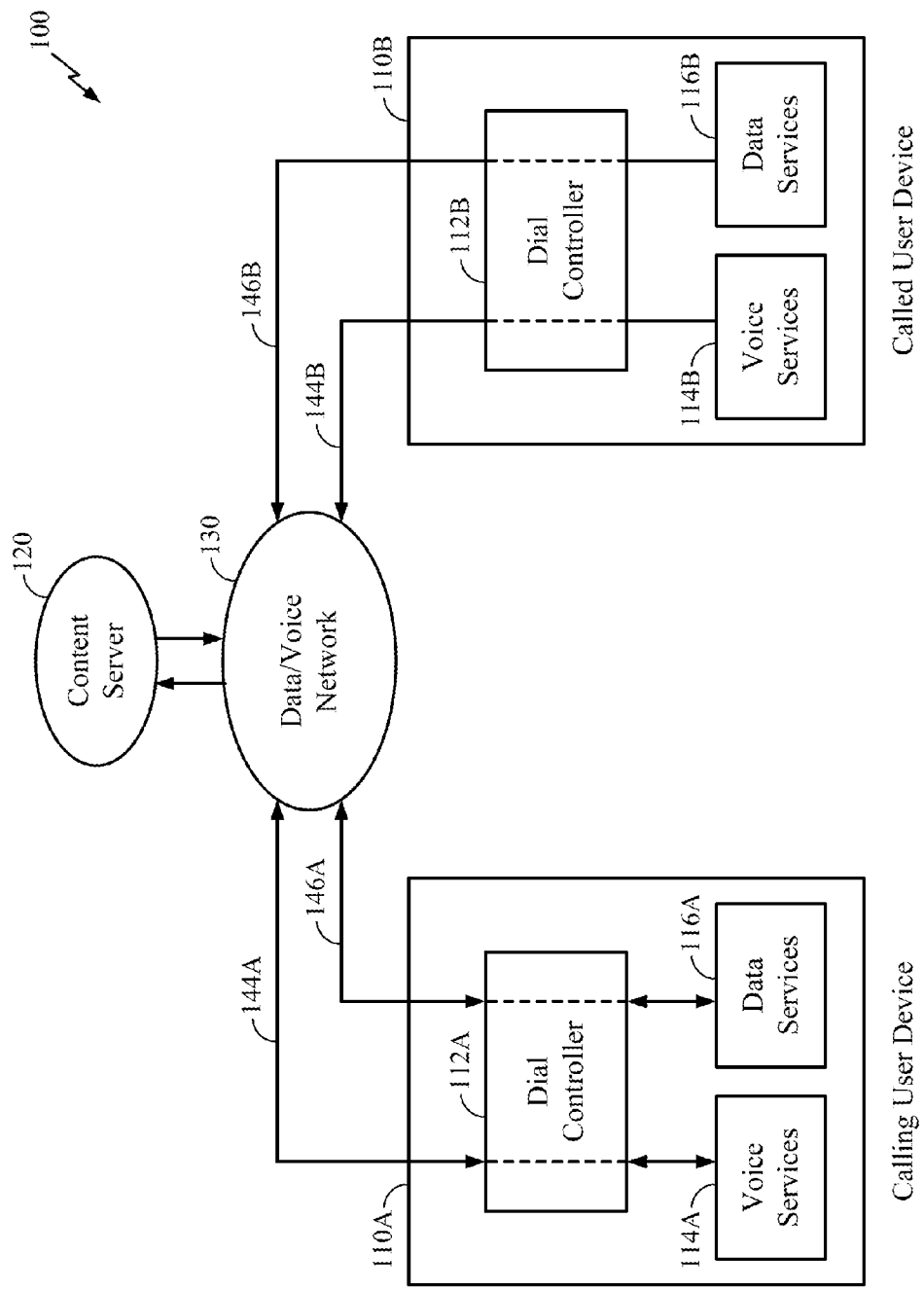
FIG. 1 illustrates a communications system according to the present disclosure.

Referring to FIG. 1, in a communications system 100, reference numerals 110A and 110B refer to communications devices. According to the present disclosure, the device 110A or 110B may be mobile or stationary. Furthermore, the device 110A or 110B may be any device that communicates through a wireless channel or through a wired channel, for example using fiber optic or coaxial cables. A device 110A or 110B may further be any of a number of types of devices including but not limited to PC card, compact flash, external or internal modem, or wireless or wireline phone. In a cellular wireless communications system, each device 110A or 110B may be also known as a remote station, a mobile station or a subscriber station.

While certain exemplary embodiments may be described herein with reference to a wireless communications system, it will be appreciated that the present disclosure need not be limited to wireless communications systems. For example, wireline communications systems, e.g., systems utilizing wired telephones, video phones, etc., may also incorporate the techniques of the present disclosure. Such alternative exemplary embodiments are contemplated to be within the scope of the present disclosure.

The devices 110A and 110B in FIG. 1 are shown implemented with smart dial controller techniques according to the present disclosure. In FIG. 1, a calling user device 110A (or "calling device") includes a dial controller 112A, a voice services module 114A, and a data services module 116A.

The voice services module 114A handles a voice connection 144A that supports voice communications, e.g., a telephone call, with another device such as 110B on the network 130. The network 130 may generally support both voice and data services. The network 130 may include, e.g., a wireless cellular network, or it may include wireline networks such as an Ethernet network coupled to a standard wireline telephone network.

The data services module 116A handles a data connection 146A that supports data communications with other devices or servers on the network 130. In exemplary embodiments, such data communications may include packet data communications conducted using Internet TCP/IP, short-messaging service (SMS), or any other type of data communications known in the art.

Both the voice connection 144A and the data connection 146A are processed by the dial controller 112A, which is functionally interposed between the network 130 and the voice services module 114A, and also between the network 130 and the data services module 116A. Note the functional interposition of the dial controller 112A in FIG. 1 is shown for illustrative purposes only, and is not meant to limit the scope of the present disclosure. In alternative exemplary embodiments, alternative functional partitioning of the modules shown to implement the techniques described may be readily derived by one of ordinary skill in the art. Such alternative exemplary embodiments are contemplated to be within the scope of the present disclosure.

The dial controller 112A may be, e.g., software running on a mobile phone that processes incoming signals from the network 130 prior to passing to the voice services module 114A and the data services module 116A, and that also processes outgoing signals from the voice services module 114A and the data services module 116A prior to passing to the network 130. The dial controller 112A may further configure the data services module 116A to access the network 130 to perform certain functions, as further described hereinbelow.

In an exemplary embodiment, the calling device 110A may simultaneously sustain both a voice connection 144A and a data connection 146A. For example, a calling device 110A may access the voice connection 144A using a W-CDMA air interface for a voice connection, and simultaneously access a data connection 146A using an HSDPA air interface. Other techniques for providing simultaneous access to a voice connection 144A and a data connection 146A are known to one of ordinary skill in the art, and contemplated to be within the scope of the present disclosure.

As further shown in FIG. 1, a called user device 110B (or "called device") also includes a dial controller 112B, a voice services module 114B, and a data services module 116B. The called device 110B also processes a corresponding voice connection 144B and data connection 146B via the dial controller 112B, as previously described with reference to the calling device 110A. The functionality of the modules of the called device 110B may be similar to that described for the modules of the calling device 110A.

While both the calling device 110A and the called device 110B are shown as including dial controllers 112A or 112B in FIG. 1, it will be appreciated that certain techniques of the present disclosure may also be implemented when only one of the calling and called devices includes a dial controller. Such alternative exemplary embodiments are further described hereinbelow, and are contemplated to be within the scope of the present disclosure.

Further shown in FIG. 1 is a content server 120 that is accessible by the calling device 110A and the called device 110B over the network 130. The content server 120 may store contextual information about users, and may deliver such contextual information to devices that query the content server, as further described hereinbelow.

Figure 2:
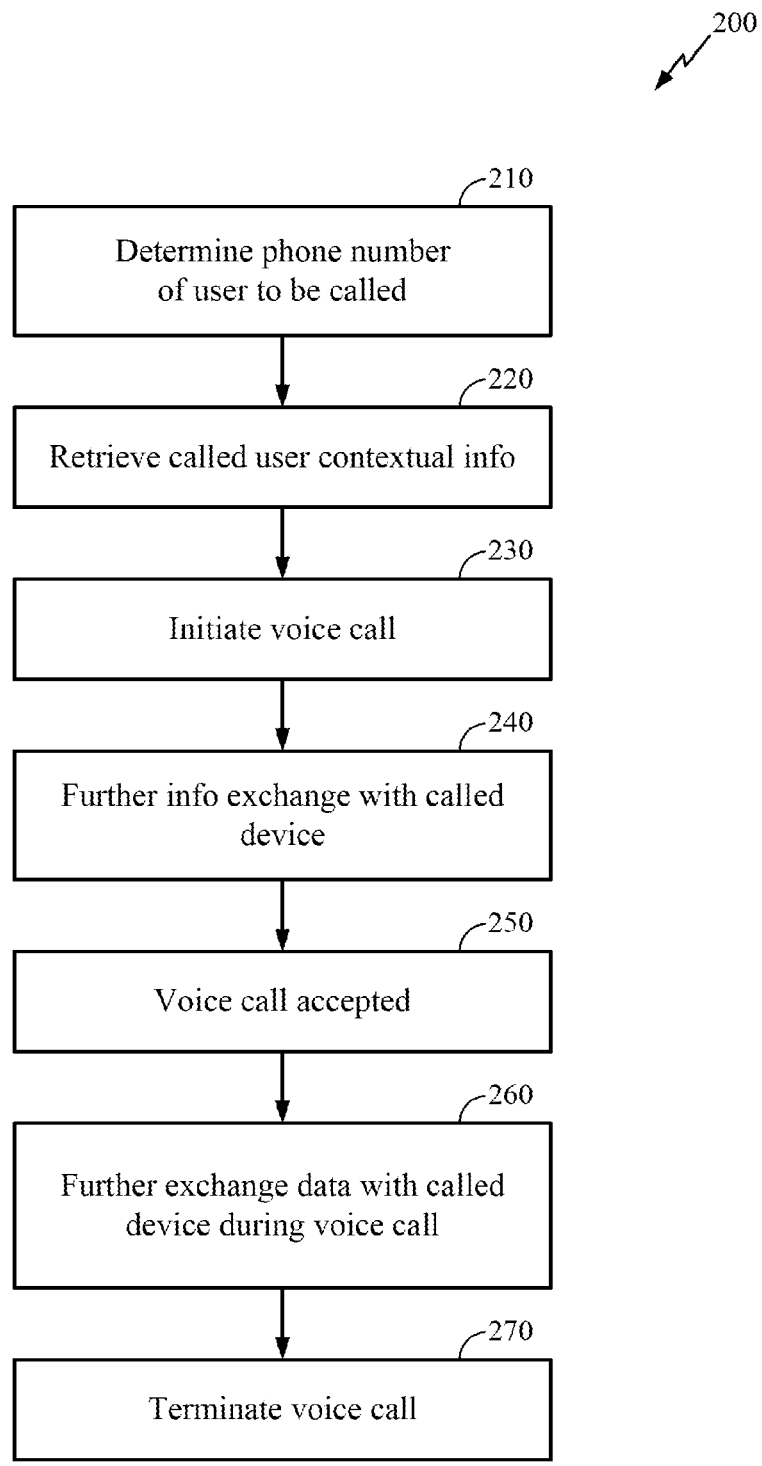
FIG. 2 illustrates an exemplary embodiment of operation of a calling device during a call according to the present disclosure.

FIG. 2 illustrates an exemplary embodiment 200 of operation of a calling device 110A when performing a voice call according to the present disclosure.

At block 210, the calling device 110A determines the phone number of a device to be called. The phone number may be input by a user (not shown) of the calling device 110A, or it may be retrieved from a memory (e.g., an address book) of the calling device 110A.

At block 220, the calling device 110A retrieves contextual information associated with the device to be called. In an exemplary embodiment, a dial controller 112A of the calling device 110A may retrieve such information from the content server 120 over the network 130, according to the phone number determined at block 210. The contextual information may include information associated with the current context of the user to be called, such as multimedia including sounds, pictures, videos, and further information such as location, communications preferences, etc. This information may have been previously uploaded to the content server 120 by the user to be called. The contextual information may be presented to a user of the calling device 110A on a user interface, e.g., displayed to the user on a display of the calling device 110A, or presented to the user using audio, voice-based, and/or other multimedia capabilities of the calling device 110A.

In an exemplary embodiment, the retrieval of information from a contextual content server may proceed as described in U.S. patent application Ser. No. 12/607,231, filed Oct. 28, 2009, the contents of which are hereby incorporated by reference in their entirety. It will be appreciated that the contextual information may be stored directly on the contextual content server, or it may be stored elsewhere at a location specified by the contextual content server.

The communications between the calling device 110A and the content server 120 may proceed over the data connection 146A. For example, the data connection may be a wireless connection such as enabled by HSDPA, cdma2000 1X-EVDO, Wi-Fi, Bluetooth, etc., or a wired connection such as enabled by an Ethernet connection, etc. The content server 120 may be accessed from the network 130, e.g., via the Internet, and thus the data connection 146A may be an Internet connection established between the calling device 110A and the content server 120. Alternatively, the data connection 146A may support other types of data communications, e.g., short messaging service (SMS). Other techniques for implementing a data connection are known in the art, and are contemplated to be within the scope of the present disclosure.

Upon retrieval from the content server 120 of contextual information associated with the person to be called, the calling device 110A initiates a voice call at block 230. The voice call may proceed, e.g., over a voice connection 144A according to techniques known to one of ordinary skill in the art for initiating a voice call over the network 130.

At block 240, prior to the voice call being established, the calling device 110A may exchange further information with the called device 110B using the data connection 146A. In an exemplary embodiment, such information may be provided by the calling device 110A to the called device 110B in response to one or more queries received from the called device 110B.

At block 250, the voice call is accepted by the called device 110B, and the voice call proceeds using the voice connection 144A.

At block 260, during the voice call, further information may be exchanged between the calling device 110A and the called device 110B using the data connection 146A.

At block 270, the voice call over the voice connection 144A terminates. In an exemplary embodiment, the data connection 146A need not be terminated once the voice call terminates. For example, the data connection 146A may remain active after the voice call for exchanging further follow-up information between the users.

In an exemplary embodiment, the dial controller 112 at the calling device 110A may be configured to execute the sequence of blocks 210-270 by, e.g., coordinating the establishment of the data connection 146A and the voice connection 144A using the data services module 116A and the voice services module 114A, respectively. The dial controller 112 may execute the sequence of blocks 210-270 in seriatim, or may alternatively omit one or more of the blocks shown, or change the order of the blocks shown in accordance with the principles of the present disclosure. Such alternative exemplary embodiments are contemplated to be within the scope of the present disclosure.

Figure 3:
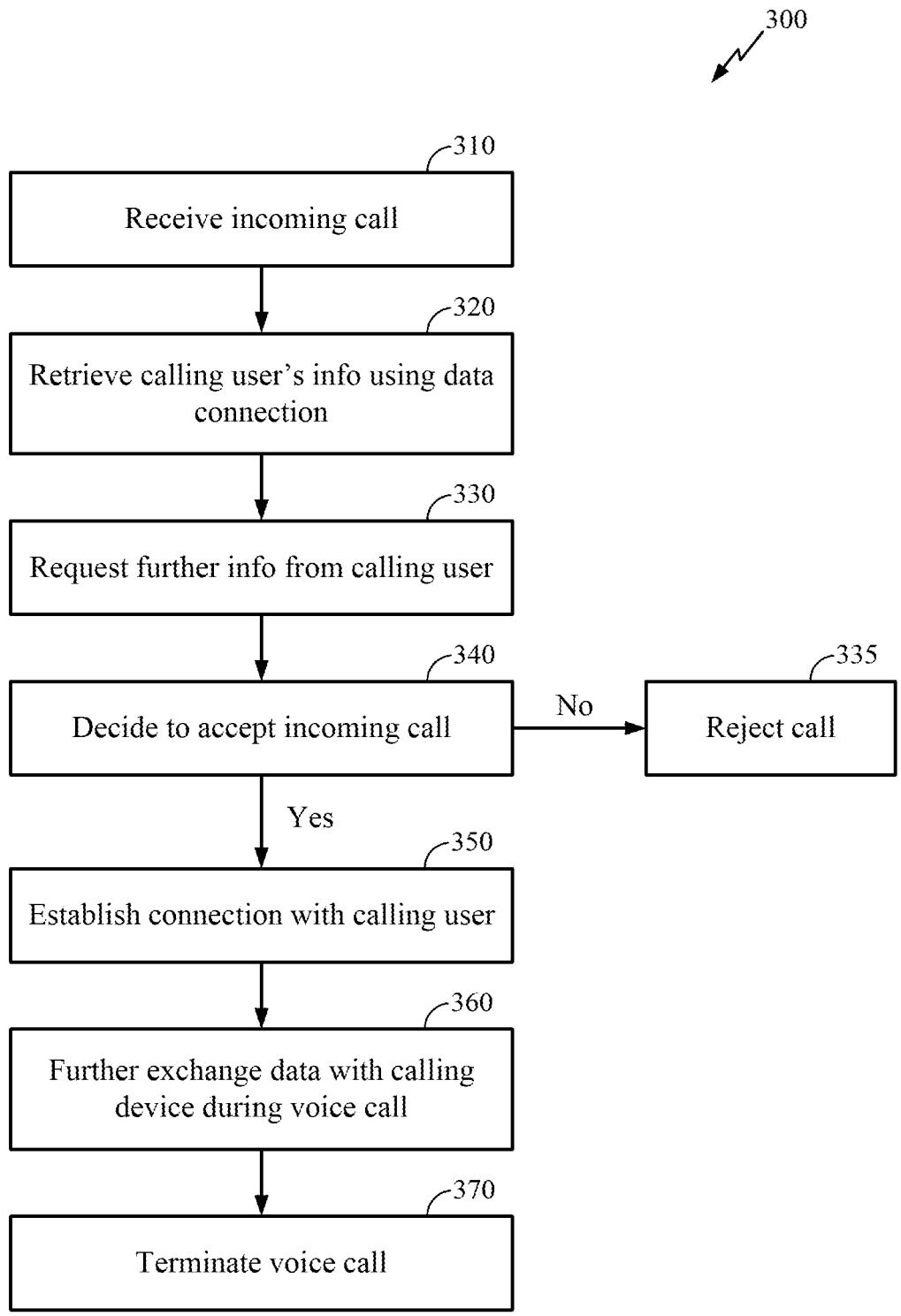
FIG. 3 illustrates an exemplary embodiment of operation of a called device during a voice call according to the present disclosure.

FIG. 3 illustrates an exemplary embodiment 300 of operation of a called device 110B during a voice call according to the present disclosure.

In FIG. 3, at block 310, the called device 110B receives an incoming voice call request, e.g., as initiated by the calling device 110A at block 230. It will be appreciated that a paging message from the network 130 associated with the incoming call may inform the called device 110B of an identity, e.g., phone number, of the calling device 110A.

At block 320, prior to accepting the voice call request, the called device 110B retrieves information associated with the calling device 110A using the data connection 146B. In an exemplary embodiment, the called device 110B may retrieve such information from the content server 120, in a manner analogous to that described for the calling device 110A. In particular, the information retrieved may include, e.g., information associated with the current context of the calling user, with examples as previously enumerated for the calling device 110A.

At block 330, the called device 110B may, in response to the information retrieved from the contextual content server 120 at block 320, request further information directly from the calling device 110A. This information request may be conducted using the data connection 146B. For example, the called device 110B may request further information about the status of the calling device 110A beyond that which is found from querying the contextual content server 120. The calling device 110A may respond to queries from the called device 110B, as previously described with reference to block 240 in FIG. 2.

Note that pending information retrieval by the called device 110B at blocks 320 and 330, the called device 110B may delay accepting the voice call initiated by the calling device 110A. This delay may be implemented by the dial controller 112B, e.g., via software control of the voice services module 114B of the called device 110B, according to techniques which may readily be derived by one of ordinary skill in the art.

At block 340, a user (not shown) of the called device 110B may decide whether or not to accept the incoming voice call from the calling device 110A. For example, upon reviewing the information retrieved from the contextual content server 120 at block 320, and/or information from the calling device 110A at block 330, the user of the called device 110B may decide to accept the call, in which case operation proceeds to block 350. Alternatively, if the user decides not to accept the call, or if the called device is configured to automatically reject calls, the call may be rejected at block 335.

At block 350, the voice call is accepted, and the call proceeds over the voice connection 144B and corresponding voice connection 144A on the calling device side.

At block 360, during the voice call, further data may be exchanged between the calling device 110A and the called device 110B using the data connections 146A and 146B.

At block 370, the voice call terminates. In an exemplary embodiment, the data connection 146B need not be terminated once the voice call terminates. For example, the data connection 146B may remain active for exchanging further follow-up information between the users following the voice call.

In an exemplary embodiment, the dial controller 112B at the called device 110B may execute the sequence of blocks 310-370 in seriatim, or may alternatively omit one or more of the blocks shown, or change the order of the blocks shown in accordance with the principles of the present disclosure. Such alternative exemplary embodiments are contemplated to be within the scope of the present disclosure.

Figure 4:
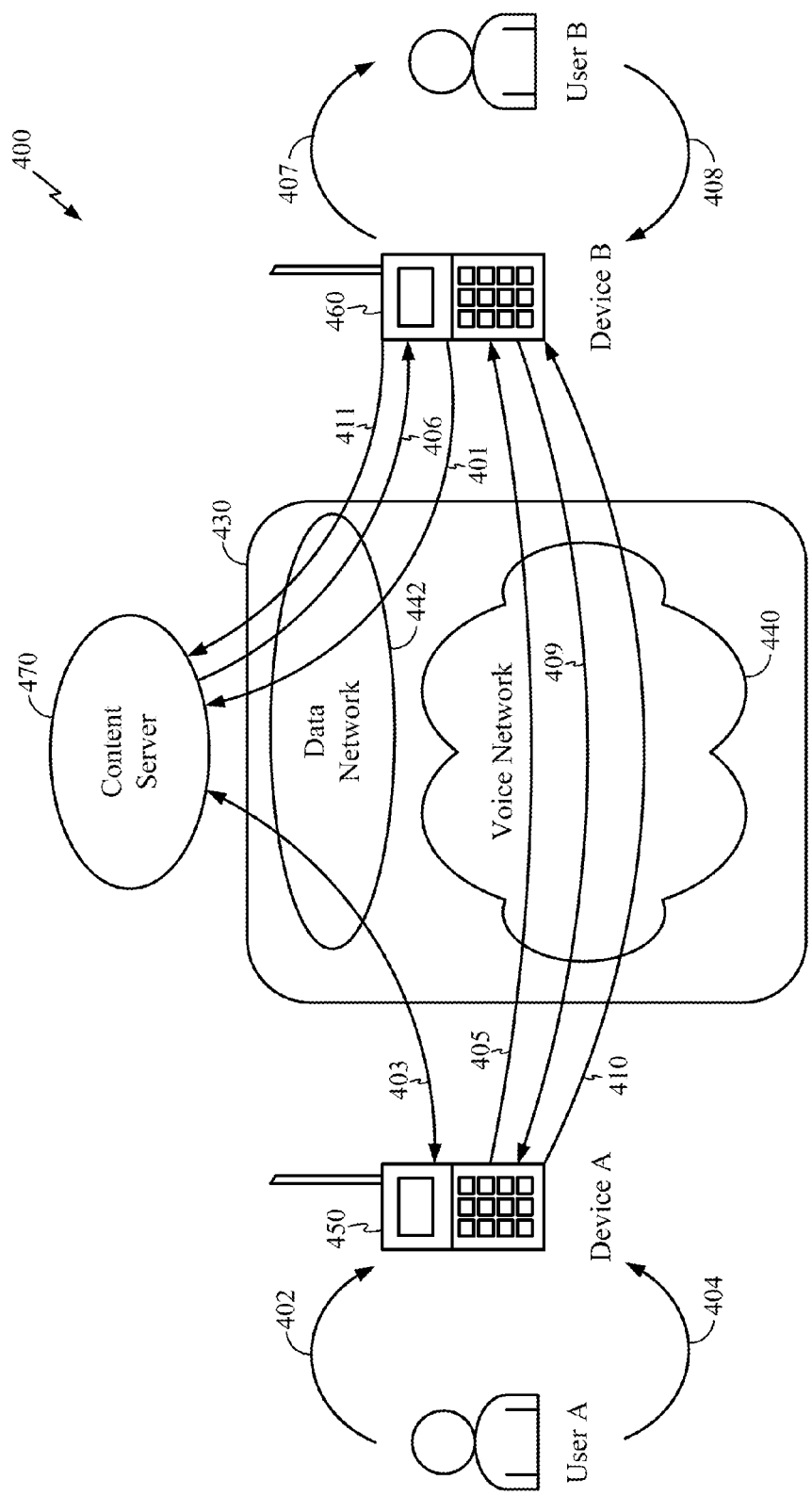
FIGS. 4 and 4A illustrate a specific exemplary embodiment of a call flow between a calling device (or Device A) and a called device (or Device B) according to the principles of the present disclosure.
Figure 4A:
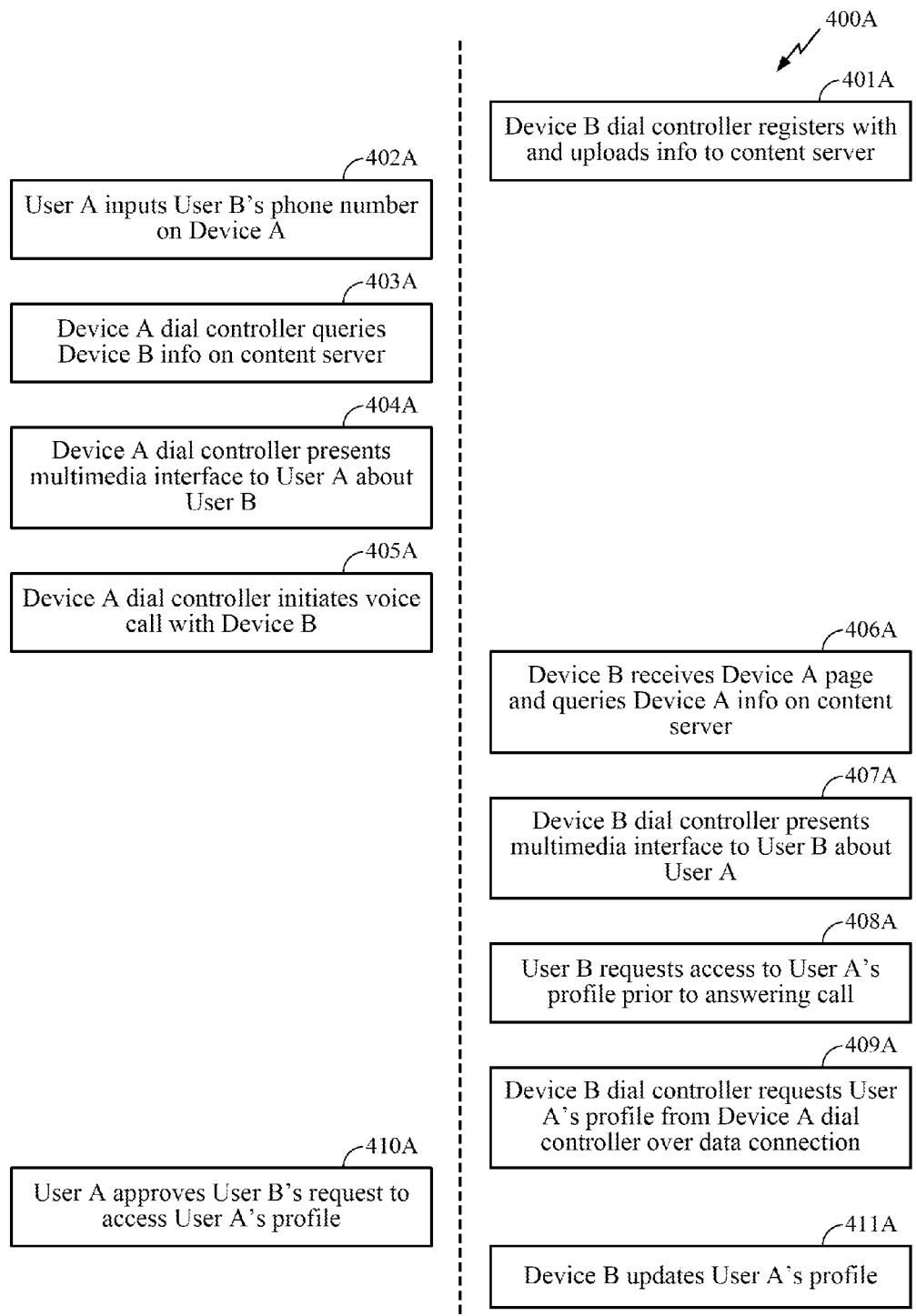

FIGS. 4 and 4A illustrate a specific exemplary embodiment of a call flow between a calling device (or Device A) 450 and a called device (or Device B) 460 according to the principles of the present disclosure. Note the exemplary call flow 400 is shown for illustrative purposes only, and is not meant to limit the scope of the present disclosure to embodiments containing any or all of the features described with reference to FIGS. 4-4A. The exemplary call flow is shown in the depiction of a communications system 400 which executes a series of procedures 401-411 in FIG. 4. Further details of the procedures are given in the corresponding blocks 401A-411A shown in FIG. 4A. Note the particular sequence of procedures shown is not meant to limit the scope of the present disclosure. In alternative exemplary embodiments, certain procedures may be omitted, and the sequence of procedures may generally differ from that explicitly shown in accordance with the techniques of the present disclosure.

At procedure 401 and block 401A, a dial controller on Device B 460 (or the Device B dial controller) registers with and uploads information about User B to a content server 470 via a data network 442, which is part of an overall network 430. The content server 470 may correspond, e.g., to the content server 120 as earlier described herein with reference to FIG. 1. In an exemplary embodiment, the Device B dial controller may communicate with the content server 470 using any type of data network, e.g., a cellular network, Wi-Fi network, Bluetooth, Ethernet, etc. It will be appreciated that access to the data network 470 by Device B may be wireless or wired.

The information uploaded by the Device B dial controller to the content server 470 may include information about User B, e.g., current location, current activity engaged in, whether User B is available to take a call, associated media, etc. The information may be uploaded periodically, or at aperiodic intervals as determined by the Device B dial controller. The Device B dial controller may also update the content server 470 with the address of Device B on the data and/or voice network, so that the content server 470 or another device may reach Device B if necessary.

At procedure 402 and block 402A, User A inputs on Device A 450 the phone number associated with Device B, in order to communicate with User B.

At procedure 403 and block 403A, the Device A dial controller queries the content server 470 for information and/or metadata about User B, e.g., as uploaded by Device B at procedure 401 and block 401A. The query may be conducted over a data connection to the content server 470 over the data network 442. In an exemplary embodiment, the query may be conducted using an identifier such as Device B's phone number, if Device B is not already in User A's address book. Alternatively, the query may be conducted using some other form of unique identifier associated with Device B, such as a unique identifier that has already been stored on the device based on previous interactions with User B. For example, the identifier may include an email identifier associated with a phone number stored in User A's address book for User B. Note the metadata and information about Device B may be retrieved directly from the content server 470, or it may be retrieved by contacting some other location that the content server 470 might redirect the Device A dial controller to.

At procedure 404 and block 404A, the Device A dial controller may present a multimedia interface to User A showing User A information about User B, depending on the results of the query conducted at block 403A. In an exemplary embodiment, the multimedia interface may include elements as shown in FIG. 5.

Figure 5:
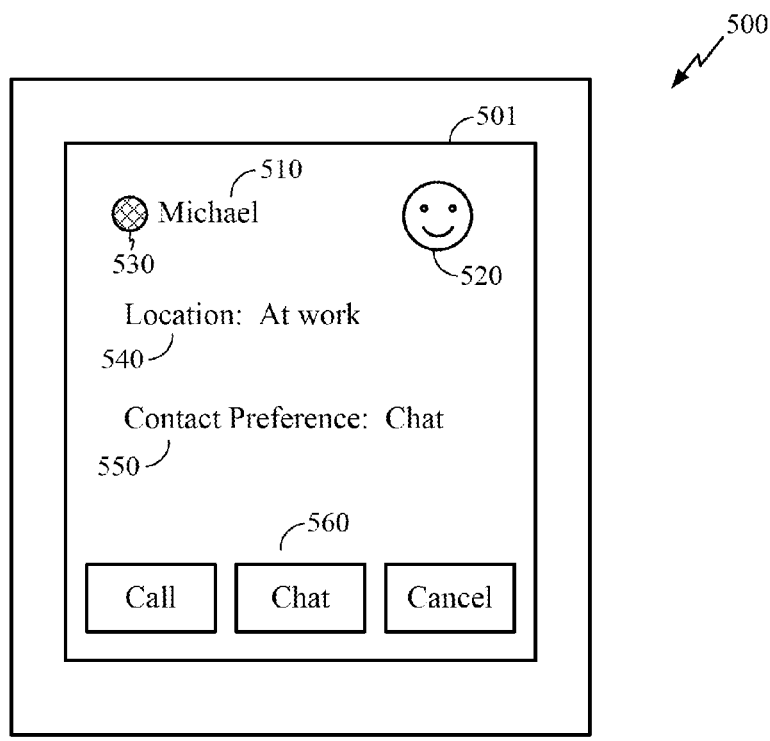
FIG. 5 illustrates an exemplary snapshot of an interface screen displayed by Device A to User A.

FIG. 5 illustrates an exemplary snapshot 500 of an interface screen 501 displayed by Device A to User A. It will be appreciated that the information shown in the interface screen 501 is given for illustrative purposes only, and is not meant to restrict the scope of the present disclosure to any particular types of information to be displayed.

In FIG. 5, the screen 501 displays information such as a name 510 of User B, an avatar 520 associated with User B, and a current geographical location 540 of User B as "At work." The screen 501 may further display a user status 530 of User B as a filled-in color circle. In an exemplary embodiment, the color of the circle may indicate the status of User B, e.g., gray may indicate that User B is offline, green may indicate that User B is available, red may indicate that User B is busy, etc. The screen 501 may further display a contact preference 550 of User B as "chat." In an exemplary embodiment, the contact preference may further include options for "voice call," and/or "do not disturb," etc. The screen 501 may further display options 560 for User A to select in contacting User B. In the example shown, User A may select to call User B, chat with User B, or cancel the process.

At procedure 405 and block 405A, the Device A dial controller initiates a voice call over the voice network to Device B upon User A's selection of "call" via the user interface of Device A. Note the Device A dial controller may alternatively initiate a chat session with Device B if User A selects "chat" instead.

At procedure 406 and block 406A, Device B receives a page from Device A, indicating that Device A is requesting a voice call be established with Device B. Upon receiving the page, the Device B dial controller queries the content server 470 about Device A over the data network 442. In an exemplary embodiment, Device B may use an identifier such as Device A's phone number (as identified from the incoming page) or other unique identifier of Device A to look up metadata and information about Device A. The metadata and information may be retrieved directly from the content server, or it might be retrieved by contacting some other location that the content server might redirect the Device B dial controller to.

It will be appreciated that the manner in which Device A accesses the data network 442 may generally be independent from the manner in which Device B accesses the data network 442. For example, Device A may access the data network via HSDPA, while Device B may access the data network using a wired Ethernet connection.

In an exemplary embodiment, a connection with the data network 442 is established by the Device B dial controller after Device B receives Device A's Caller ID from the incoming page, but prior to User B accepting the voice call from Device A and a voice call session being established. It will be appreciated that there may be some delay while this data connection is being established. In an exemplary embodiment, during such a delay period, the Device B dial controller may display, e.g., a previously cached profile for User A (if available) via the Device B user interface.

At procedure 407 and block 407A, the Device B dial controller may present a multimedia interface to User B showing information retrieved from the content server 470 about User A based on Device A's identifier. In an exemplary embodiment, the information and information format displayed using the interface may depend on a variety of factors including, but not limited to, whether User A has shared his/her profile with User B, the status of User A as User B's friend, colleague, or unknown business solicitor, etc.

In an alternative exemplary embodiment (not shown), in conjunction with, or in lieu of the Device B dial controller presenting a multimedia interface to User B at procedure 407 and block 407A, the Device B dial controller may take other automatic action in response to receiving a call or request for more information. For example, the Device B dial controller may be configured to automatically reject calls from certain or all parties, or divert all calls to voicemail, or convert all voice calls into an Instant Messaging session, etc., if so preconfigured by User B. For example, User B may currently be in a meeting, and may configure the Device B dial controller to automatically reject all calls, except from some users designated as "VIP users," etc. Such alternative exemplary embodiments are contemplated to be within the scope of the present disclosure.

Figure 6:
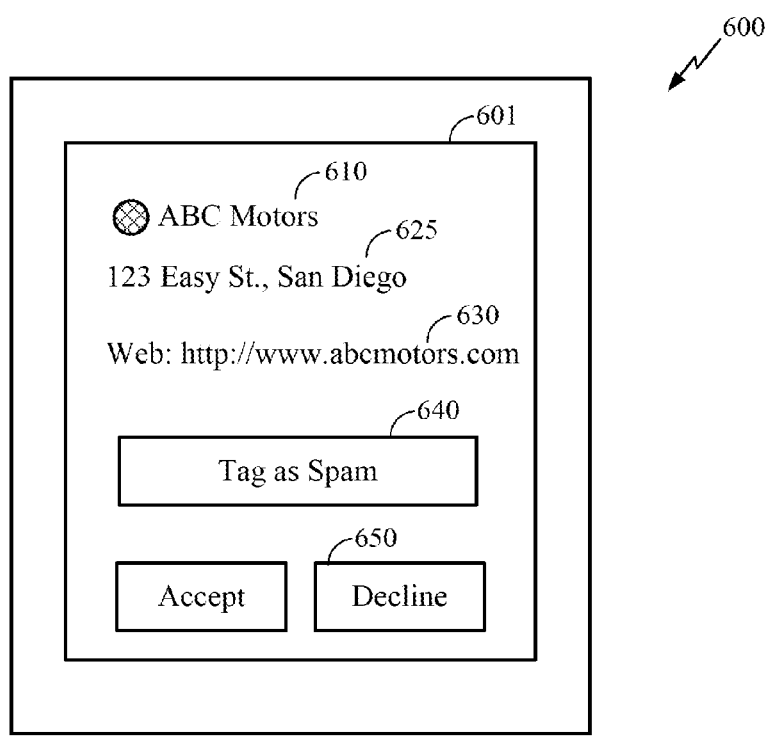
FIG. 6 illustrates an exemplary snapshot of an interface screen displayed by Device B to User B about User A, in the case wherein User A is an unsolicited business caller.

FIG. 6 illustrates an exemplary snapshot 600 of an interface screen 601 displayed by Device B to User B about User A, in the case wherein User A is an unsolicited business caller. Note FIG. 6 may include some of the same information as FIG. 5, and descriptions of corresponding information will not be repeated.

In FIG. 6, the screen 601 displays information such as the name 610 of User A (e.g., a business name), a physical location 625 (or address) of User A, and a website 630 associated with User A. In an exemplary embodiment, User B may click on the website link 630 to directly access the website via a browser resident on Device B. In an exemplary embodiment, pictures and other media (not shown) associated with User A may further be displayed on the screen 601. Note the information shown on the screen 601 may be maintained and periodically updated by User A on the content server 470, via Device A or via any other means for data communication.

In an exemplary embodiment, User A may update the content server 470 via Device A. In an alternative exemplary embodiment, even if Device A is not equipped with a dial controller, User A may still manage User A's profile on the content server, e.g., using a web-based mechanism independent of Device A, such as a web browser. In this exemplary embodiment, a full profile for User A may still be displayed on Device B when User A calls User B. Similarly, the same applies if Device A is equipped with a dial controller, but Device B is not. In this case, User B may nevertheless update User B's profile on the content server using techniques other than through Device B, and User A may thus be presented with the profile of User B as stored on the content server and updated through such alternative techniques. Such alternative exemplary embodiments are contemplated to be within the scope of the present disclosure.

Screen 601 further displays an option 640 for User B to tag incoming voice calls from Device A as spam. In this manner, the Device B dial controller may incorporate the features of a phone spam filter. Screen 601 further displays an option 650 for allowing User B to accept or decline the call from Device B.

In the example shown in FIG. 6, a "chat" button is not displayed to User B, as may be the case if Device A is not a device equipped with a dial controller, e.g., a standard landline phone. Note if Device A is not equipped with a dial controller, the Device B dial controller may detect this fact, e.g., through the content server 470, and in response, restrict the contact options displayed by Device B to User B. Alternatively, if Device A is equipped with a dial controller, then the Device B may also display such information to User B.

Figure 7:
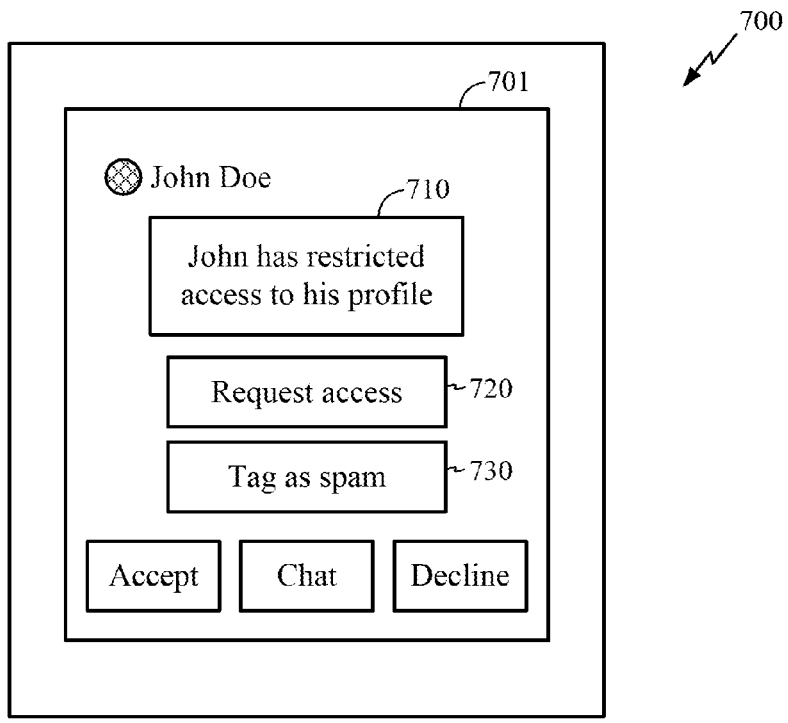
FIG. 7 illustrates an exemplary snapshot of an interface screen displayed by Device B to User B about User A, in the case wherein User A is an unknown individual.

FIG. 7 illustrates an exemplary snapshot 700 of an interface screen 701 displayed by Device B to User B about User A, in the case wherein User A is an unknown individual. In FIG. 7, the screen 701 displays User A's name and picture, assuming that User A has configured its entry on the content server to share such information with the public. The location of User A, however, is unavailable, as it assumed that User A has not chosen to publicly share such information. The screen 701 further indicates at 710 that User A has chosen to restrict access to his profile.

The screen 701 further presents buttons 720 and 730 to allow User B to either request access to User A's profile, or tag User A's call as spam, respectively. The screen 701 further allows User B to accept the call, chat with User B, or decline the call. In an exemplary embodiment, selecting the "chat" button allows User B to convert the voice call from User A into a text chat using, e.g., SMS or capabilities provided by a data network.

At procedure 408 and block 408A, User B may request to access User A's profile prior to answering the call by selecting the button 720. Thereafter, at procedure 409 and block 409A, the Device B dial controller may contact the Device A dial controller over the data network 442 to request such access directly from User A. In an exemplary embodiment, the Device B dial controller may automatically generate and send a request to the Device A dial controller over SMS or other data connection over the data network 442 requesting access to User A's profile. In response, the Device A dial controller may display a screen to User A such as shown in FIG. 7A.

Figure 7A:
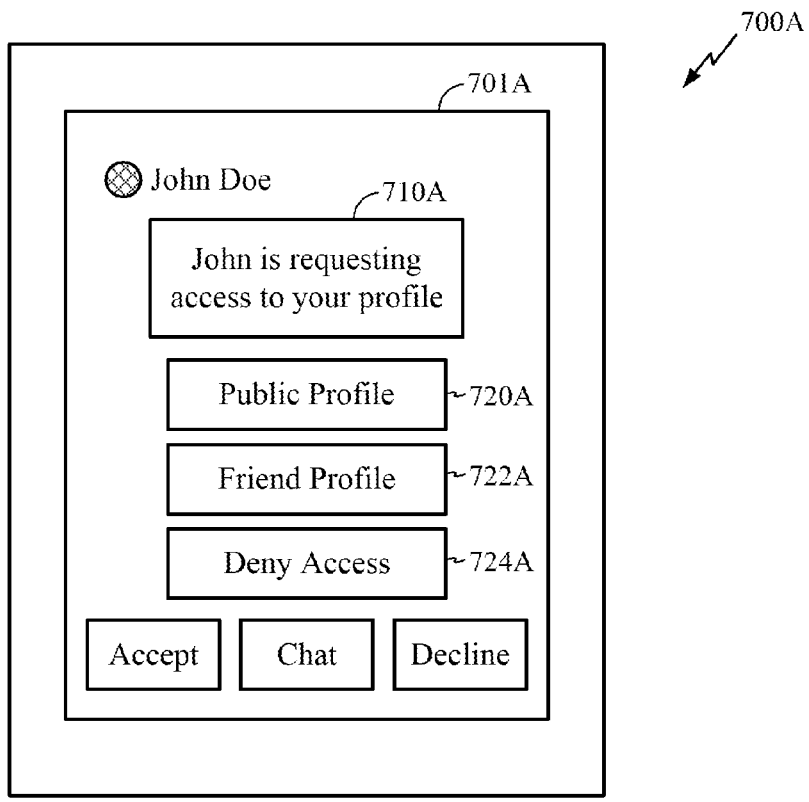
FIG. 7A illustrates an exemplary snapshot of an interface screen displayed by Device A to User A, in response to the Device A dial controller receiving a request to access profile from the Device B dial controller.

FIG. 7A illustrates an exemplary snapshot 700A of an interface screen 701 displayed by Device A to User A, in response to the Device A dial controller receiving a request to access profile from the Device B dial controller. In FIG. 7A, a button 710A indicates to User A that User B ("John") is requesting access to User A's profile. A button 720A allows access to User A's public profile. A button 722A allows access to User A's friend profile. A button 724A denies access to User A's profile. User A may select one of the buttons 720A, 722A, or 724A, and User B may subsequently be allowed or denied access to User A's profile based on User A's selection.

At procedure 410 and block 410A, User A may approve User B's request in real time (e.g., while waiting for User B to answer the voice call), and User A's approval may go back to the Device B of User B through the data connection.

In alternative exemplary embodiments, blocks 409A and 410A need not be executed using a direct data connection between Device B and Device A, and may instead proceed using the content server 470 as an intermediary.

Figure 8:
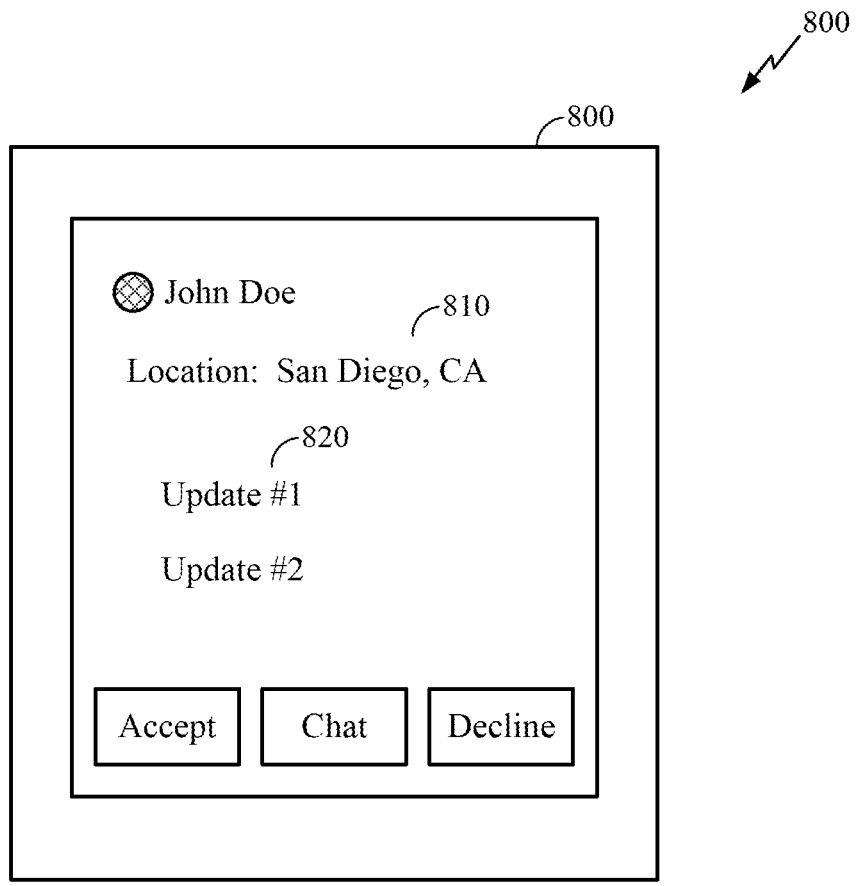
FIG. 8 illustrates an exemplary snapshot of an interface screen displayed by Device B to User B about User A, in the case wherein User A is an individual known to User B, or a "friend."

At procedure 411 and block 411A, upon approval of User B's request by User A, the Device B dial controller may update the interface presented to User B about User A. FIG. 8 illustrates an exemplary snapshot 800 of an interface screen 801 displayed by Device B to User B about User A, in the case wherein User A is an individual known to User B, or a "friend." In an exemplary embodiment, the identity of User A may be validated to User B using a public key, or simply if User A's phone number is already in Device B's address book. In an exemplary embodiment, the screen 801 may be displayed by Device B to User B after User A has granted User B access to User A's profile, e.g., as described at procedures 409-410 and block 409A-410A. In FIG. 8, the screen 801 displays User A's name, picture, and location, which User A has previously made available to friends via the content server. The screen 801 may further display a series of updates 820 from User A, which may include, e.g., User A's "tweets," pictures, and/or other information from their online social network. In an exemplary embodiment, information about User A may be maintained by User A on the content server, or directly on Device A, where it may be retrieved by Device B's dial controller.

It will be appreciated that certain aspects of the present disclosure may be implemented even when a calling (or called) device does not support simultaneous voice and data connections. For example, if a calling or called device has access to a voice connection and a data connection, but not simultaneously, then the calling device may first utilize its data connection to obtain information from a server or from the called device, and thereafter initiate the voice call using the voice connection. In an exemplary embodiment, the calling device or the called device may, during periods when a voice call is not in progress, periodically upload information regarding its state to a server. Other devices may periodically download state information regarding the most frequently called/calling users, and cache such state information locally on the device during periods when the device is not engaged in a voice call.

It will be appreciated that aspects of the present disclosure are backward-compatible, as the present techniques require no extra modifications to the normal procedures for establishing a voice call. Thus these aspects may advantageously be implemented without any changes to the network by the voice or data service provider.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. An apparatus comprising:
a memory unit; and
at least one processor coupled to the memory unit, the at least one processor configured:
to receive, at a first device, a first user input for an identifier of a second device;
to retrieve, at the first device, context information for the second device, the context information for the second device being retrieved in response to the identifier and prior to initiating a voice call with the second device;
to output the context information for the second device via a user interface of the first device;
to initiate the voice call with the second device; and
to grant access, to the second device, to context information for the first device after the voice call is initiated and prior to the voice call being established, the access being granted to the second device to allow the context information for the first device to be exchanged between the first device and the second device, the context information consisting of one or more of: a name, a physical location, an avatar, a picture, a website, a current status, a contact preference, or a combination thereof.

2. The apparatus of claim 1, in which the at least one processor is further configured to exchange data with the second device prior to initiating the voice call.

3. The apparatus of claim 1, in which the at least one processor is further configured to retrieve the context information for the second device by querying a content server.

4. The apparatus of claim 1, in which the at least one processor is further configured to upload the context information for the first device to a content server.

5. A method for wireless communication, the method comprising:
receiving, at a first device, a user input for an identifier of a second device;
retrieving, at the first device, context information for the second device, the context information for the second device being retrieved in response to the identifier and prior to initiating a voice call with the second device;
outputting the context information for the second device to a user of the first device;
initiating the voice call with the second device;
granting access, to the second device, to context information for the first device;

exchanging the context information for the first device between the first device and the second device prior to establishing the voice call; and establishing the voice call with the second device, the context information consisting of one or more of: a name, a physical location, an avatar, a picture, a website, a current status, a contact preference, or a combination thereof.

6. The method of claim 5, further comprising querying a content server to retrieve the context information for the second device.

7. An apparatus comprising:

means for receiving, at a first device, a user input for an identifier of a second device;

means for retrieving, at the first device, context information for the second device, the context information for the second device being retrieved in response to the identifier and prior to initiating a voice call with the second device;

means for outputting the context information for the second device to a user of a first device prior to initiating the voice call with the second device;

means for initiating the voice call with the second device; and means for granting access, to the second device, to context information for the first device after the voice call is initiated but prior to the voice call being established, the access being granted to the second device to allow the context information for the first device to be exchanged between the first device and the second device, the context information consisting of one or more of: a name, a physical location, an avatar, a picture, a website, a current status, a contact preference, or a combination thereof.

8. A computer program product comprising:

a computer-readable medium having non-transitory program code recorded thereon, the program code comprising:

program code to receive, at a first device, a user input for an identifier of a second device;

program code to retrieve, at the first device, context information for the second device, the context information for the second device being retrieved in response to the identifier and prior to initiating a voice call with the second device;

program code to output the context information for the second device to a user of the first device;

program code to initiate the voice call with the second device;

program code to grant access, to the second device, to context information for the first device;

program code to exchange the context information for the first device between the first device and the second device prior to establishing the voice call; and program code to establish the voice call with the second device, the context information consisting of one or more of: a name, a physical location, an avatar, a picture, a website, a current status, a contact preference, or a combination thereof.

9. The apparatus of claim 1, in which the at least one processor is further configured to receive a second user input for initiating the voice call subsequent to outputting the context information for the second device.

10. The apparatus of claim 9, in which the at least one processor is further configured to, in response to the second user input, establish a chat session with the called device.

* * * * *